United States Patent [19]

Oberle

[11] Patent Number: 4,879,124
[45] Date of Patent: Nov. 7, 1989

[54] PERFORATED COOK-IN SHRINK BAG

[75] Inventor: Timothy T. Oberle, Duncan, S.C.

[73] Assignee: W. R. Grace & Co.-Conn, Duncan, S.C.

[21] Appl. No.: 183,116

[22] Filed: Apr. 19, 1988

Related U.S. Application Data

[63] Continuation of Ser. No. 785,419, Oct. 8, 1985, abandoned.

[51] Int. Cl.$^4$ ...................... B65D 81/34; B65D 30/08; B65D 30/02
[52] U.S. Cl. .................................... 426/113; 426/127; 426/129; 426/412; 383/103; 206/497
[58] Field of Search ............... 426/412, 113, 118, 395, 426/415, 410, 413, 106, 127, 77, 81, 82, 83, 84, 129; 383/102, 103, 117, 118; 229/DIG. 12, DIG. 14; 206/497; 53/442, 440; 264/154, 155, 156

Primary Examiner—Steven Weinstein
Attorney, Agent, or Firm—John J. Toney; William D. Lee, Jr.; Jennifer L. Skord

[57] ABSTRACT

In order to reduce splitting in a perforated, heat shrinkable, thermoplastic bags made from seamless tubing, rather than employ needle punched perforations, it has been discovered that slits cut by a knife blade will surprisingly reduce the splitting when a product, such as a meat product, is cooked within the bag.

3 Claims, 1 Drawing Sheet

PERFORATED COOK-IN SHRINK BAG

This is a continuation application of application Ser. No. 785,419, filed on Oct. 8, 1985, now abandoned.

FIELD OF THE INVENTION

This invention relates to thermoplastic, heat shrinkable bags in which a food product is cooked. More particularly, the invention relates to perforated, heat shrinkable bags in which meat products such as turkey breast, ham or the like may be baked or roasted.

BACKGROUND OF THE INVENTION

In order to hold meat sections together, prevent dryness, and preserve tenderness it has been found desirable to cook certain meat products within a plastic bag. Many cook-in bags or bake-in bags or pouches are currently available on the market.

In order to obtain the benefits of being a roasted or baked product, moisture must be allowed to escape from the cook-in bag and one way of doing this has been to perforate the bag. The perforations also prevent ballooning and collection of moisture which can possibly lead to uneven cooking.

In order to perforate the film from which plastic bags are made, needle perforation has been used in the past with both hot and cold needles. Also, in some instances, perforations have been made with flame applied to the film as it pases over a selectively cooled drum.

In certain commercial operations, it is particularly desirable to use a shrinkable bag or pouch to hold turkey breast, ham, or other meat sections or parts closely together. Shrinkable bags which have been needle perforated have produced undesirable tears and splitting as the bag shrinks around the product and is placed under tension during the cooking process.

Accordingly, it is one object of the present invention to provide a perforated, shrink bag which will resist splitting when shrunk.

It is another object of the present invention to provide a satisfactory bag for roasting or baking a meat product therein.

These and other objects are achieved by the present invention which is summarized below.

SUMMARY OF THE INVENTION

In one aspect, the present invention is the perforated shrink bag in which meat products or the like may be cooked comprising a seamless, heat shrinkable tube of thermoplastic film forming the body of the bag; a transverse heat seal closing one end of the tube, said closed end defining the bottom of the bag, the other end defining the mouth of the bag; and an array of perforations in the body of said bag, each perforation being an elongated slit aligned to extend in the transverse direction of the bag whereby when the bag is heat shrunk with a product enclosed therein longitudinal splitting is reduced. Preferably the slits are 1/16" to 3/32" long.

In another aspect, the present invention is an improvement in the process of making a perforated bag made from heat shrinkable, thermoplastic film in which meat products or the like are cooked wherein the improvement comprises perforating the bag by slitting the bag in an array of slits. This slitting is preferably done by a v-shaped knife blade and the slits are preferably spaced ¾" to 1¼ apart transversely and longitudinally. The improvement is particularly useful for perforating two layers of film with one stroke of the perforating instrument such as perforating a lay flat tubing and is also particularly useful where the film thickness is 4.0 mils or less.

In another aspect, the invention is a package comprising a meat product or the like; a perforated, seamless thermoplastic tube enclosing a product therein; said tube being shrunken around the product and said perforations being in the form of slits. Preferably, the material from which the thermoplastic, heat shrinkable tube is formed is a multi-layer film material having a sealing layer comprising a polymer selected from the group consisting of ethylene-acrylic acid copolymers (EAA), ethylene-methacrylic acid copolymers (EMAA), ionomers and blends of an ionomer, EAA, or EMAA with a polyolefin; and, at least one other layer comprising a blend of ethylene-vinyl acetate copolymer with a linear low density polyethylene.

In a typical process, a rolled turkey breast, for example, would be stuffed into a perforated bag according to the present invention, the bag closed, heat shrunk, the turkey breast roasted in an oven, and thereafter cooled and packaged in a vacuum bag for distribution into retail outlets such as delicatessens, restaurants or institutional cafeterias.

DESCRIPTION OF THE DRAWINGS

Appended hereto and made a part of this disclosure are the drawings in which.

DETAILED DESCRIPTION

Figure 1:
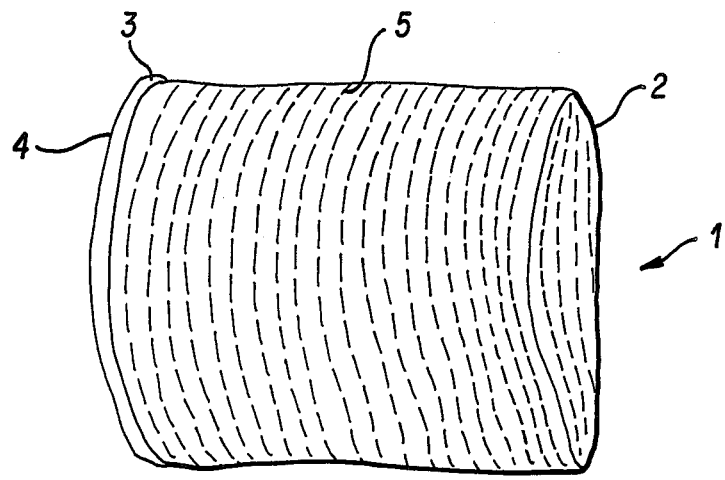
FIG. 1 is a schematic representation of a bag according to the present invention showing exaggerated form the slits therein; and, FIG. 2 is a section in schematic form and exaggerated detail from the bag material of FIG. 1 showing the slits according to the present invention.
Figure 2:
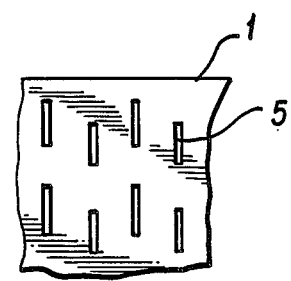

In FIG. 1 perforated bag 1 is shown having a open end designated as mouth 2 for receiving a product therein and a closed end sealed by end seal 3 defining the bottom of the bag. Margin 4 extends beyond the seal and perforations 5 are arrayed over the bag surface as shown. FIG. 2 shows the perforations 5 in bag 1 in greater detail.

Bag 1 is preferably formed from a seamless tube of thermoplastic material. A typical lay flat width of the material is 10" and a preferred thickness would be about 2.4 mils. The closed end is formed by an end seal 3 which is a heat seal made by the application of heat and pressure so that for this embodiment it is desirable that the interior layer of the bag material be formed from a heat sealable material.

A preferred bag material is one made from a multi-layer thermoplastic film having at least one layer of an ionomer for the sealing layer, said ionomer being one of those sold under the brand name "Surlyn." The sealing layer will be the layer which forms the inner face of the bag and is the layer sealed to itself to make the bag end seal. An additional layer of a blend of ethylene vinyl acetate copolymer and linear low density polyethylene makes a quite satisfactory multi-layer film. A particularly preferred film layer construction is one as follows:

15/85 (ionomer+LLDPE)/70/30
(EVA+LLDPE)/50/50 (EVA+LLDPE)

The linear low density polyethylene is preferably one of those sold under the "Dowlex" brand and the ratio of the blend is 85% linear low density polyethylene (LLDPE) with 15% Surlyn ionomer. In the 70%/30% blend of ethylene vinyl acetate copolymer (EVA) with LLDPE, the vinyl acetate content of the EVA is 9%. In the 50%/50% blend of EVA and LLDPE the vinyl acetate content is 6% in the EVA. The multi-layer structure is coextruded, cross-linked by irradiation to a low dosage, namely, a dosage level in the range of 0.5 to 2 MR, to cross link the cross-linkable polymers and, in this instance, the EVA and LLDPE cross-link. The material is then biaxially oriented by the "trapped bubble" technique which is well known to those skilled in the art. The result from the process is a biaxially oriented tubing which is rolled up in lay flat form and the preferred widths are about 10". Thickness may range from 2.0 to 4.0 mils.

In general, as the sealing layer, ethylene-acrylic acid copolymers (EAA) may be used. The Surlyn ionomers are ethylene-methacrylic acid copolymers (EMAA) neutralized with a zinc or sodium salt. These copolymers will give adhesion with or without the metal neutralization. Surlyn ionomer, being relatively expensive, is used in a low proportion in the blend but in sufficient concentration to give the desired sealing properties. Thus, in the preferred sealing layer blend the proportion is 85% LLDPE and 15% ionomer for adequate sealing with lowest ionomer concentration. To improve sealing, if needed, a blend of 80/20 of ionomer/LLDPE could be used.

To perforate the lay flat tubing both cold and hot needles were first tried. Needles which would penetrate both layers produced film which produced an unacceptably high number of split bags when the bags were heat shrunk around a product. Increasing the gauge or thickness alleviated the problem somewhat but to make a material thicker than necessary is an uneconomical consumption of relatively expensive thermoplastic materials.

In the prior art, perforated films have been made in single layer form with hot needles, cold needles, and by the application of flame. Afterwards, the single layer is formed into a tube or bag. A typical bag of the single layer film that is sealed in panels is shown in U.S. Pat. No. 4,503,561 which issued on Mar. 5, 1985 to Edward C. Bruno. The bag disclosed in the aforementioned patent has at least two distinct panels of film and the panels have slits in them to provide a ventilated bag.

In order to use an economically thin tube material and to perforate the tubing in one operation so that a seamless tube can be used to produce a bag with a minimum number of sealing operations, it has been surprisingly discovered that slits may be cut into the tubing to produce the required perforations. The perforations may be put in by hand with a v-blade knife or a roll provided with spaced apart knife blades across its surface in the desired spacing and array. To achieve the proper distribution of slits it is found that the blades should be mounted in a helical manner or a roll. This arrangement aids in the slitting and removal of the knife from the slit. The preferred slit length is 1/16" to 3/32" and a spacing transversely of ¾ to 1¼" has been found to be quite satisfactory. The same spacing range is satisfactory for the longitudinal spacing of the slits.

In a 10" lay flat width bag according to the present invention, a 9 to 10 lb. turkey breast readily fits. The turkey breast is preferably cooked to an internal temperature of about 160° F. with the maximum oven temperature in the range of about 170° F.

Typically the bag is stuffed with the breast of turkey and pressed so that the entrapped air will escape through the perforations. The bag can either be clipped or the excess bag neck folded under the product when the product is placed on oven racks. It is during the cooking process that the shrinkable material shrinks with predominantly transverse shrink tension thereby keeping the breast compressed and firm. The transverse perforations or slits withstand this shrinking transversely quite well. Shrinkage in the longitudinal direction occurs but the internal stress is not in the same order of magnitude as the transverse tension is. Thus, a quite satisfactory cooked product with an unsplit bag can be produced. After cooking, the product is then cooled, packed in a vacuum bag under evacuated conditions, sealed, and shipped to delicatessens or other outlets for consumption.

While the foregoing is a description of one embodiment of the present invention, it is understood that the above disclosure is by way of illustration only and is not limiting to the invention which is further defined in the claims which follow:

I claim:

1. A sealed perforated heat shrinkable bag containing a meat product to be cooked therein comprising:
   (a) a seamless, biaxially oriented heat shrinkable tube of thermoplastic film forming the body of the bag;
   (b) a transverse heat seal closing one end of the tube, said closed end defining the bottom of the bag, the other end defining the mouth of the bag which too is closed and wherein said meat product is contained therein, said heat shrinkable thermoplastic film shrinking with predominantly transverse shrink tension;
   (c) an array of spaced apart perforations in the body of said bag, said perforations being arrayed and spaced apart relative to each other in both the transverse and longitudinal direction of the bag, each perforation being an elongated slit aligned to extend in the transverse direction of the bag and the slits are dimensioned both in length and the space between slits sufficient such that when the bag is heat shrunk during cook-in with said meat product enclosed therein splitting of the tube film is reduced during cook-in, as compared to needle perforated film.

2. The bag of claim 1 wherein said film thickness is in the range of 2.0 to 4.0 mils and the slits are 1/16" to 3/32" long.

3. The bag of claim 1 wherein the slits are spaced apart in the range of ¾" to 1¼" both transversely and longitudinally.

* * * * *